(12) United States Patent
De Bardonnèche

(10) Patent No.: US 12,402,717 B2
(45) Date of Patent: Sep. 2, 2025

(54) APPLICATION DEVICE FOR A FLUID OR PASTY PRODUCT

(71) Applicant: SOCIÉTÉ INDUSTRIELLE DE MATIÈRES PLASTIQUES, Tigery (FR)

(72) Inventor: Eric De Bardonnèche, Montaren-et-Saint-Médiers (FR)

(73) Assignee: SOCIÉTÉ INDUSTRIELLE DE MATIÈRES PLASTIQUES, Tigery (FR)

( * ) Notice: Subject to any disclaimer, the term of this patent is extended or adjusted under 35 U.S.C. 154(b) by 337 days.

(21) Appl. No.: 18/024,191

(22) PCT Filed: Sep. 4, 2020

(86) PCT No.: PCT/EP2020/074840
§ 371 (c)(1),
(2) Date: Mar. 1, 2023

(87) PCT Pub. No.: WO2022/048771
PCT Pub. Date: Mar. 10, 2022

(65) Prior Publication Data
US 2023/0292915 A1    Sep. 21, 2023

(51) Int. Cl.
*A46B 3/00* (2006.01)
*A46B 9/02* (2006.01)
*A46D 1/00* (2006.01)

(52) U.S. Cl.
CPC .............. *A46B 3/005* (2013.01); *A46B 9/021* (2013.01); *A46B 9/025* (2013.01); *A46D 1/0253* (2013.01); *A46B 2200/1053* (2013.01)

(58) Field of Classification Search
CPC ......... A46B 3/00; A46B 3/0005; A46B 9/021; A46B 2200/1053; A46D 1/0253; B29C 45/2626
See application file for complete search history.

(56) References Cited

U.S. PATENT DOCUMENTS

| D664,361 S | * | 7/2012 | Edmondson | ........... A46B 9/021 |
| | | | | D4/128 |
| 2011/0229246 A1 | * | 9/2011 | Kulik | ...................... A46B 9/021 |
| | | | | 132/218 |

(Continued)

FOREIGN PATENT DOCUMENTS

| FR | 2837077 | 9/2003 |
| FR | 2937514 | 4/2010 |

(Continued)

OTHER PUBLICATIONS

English Translation of Search Report issued in Appl. No. PCT/EP2020/074840 (May 21, 2021).

*Primary Examiner* — Rachel R Steitz
*Assistant Examiner* — Karim Asqiriba
(74) *Attorney, Agent, or Firm* — Barnes & Thornburg LLP; G. Peter Nichols

(57) ABSTRACT

An application device for applying a fluid product to keratin fibres includes a plurality of spikes that are distributed over an elongate core extending along a longitudinal axis X. Each spike has a first stage that extends from an anchoring end in the core towards an intermediate section, a second stage that extends from the intermediate section towards a free end, and a joint face parallel to the longitudinal axis X. Each spike has an intermediate point and an apical point.

17 Claims, 9 Drawing Sheets

(56) References Cited

U.S. PATENT DOCUMENTS

| | | |
|---|---|---|
| 2012/0170965 A1 | 7/2012 | Kulik et al. |
| 2015/0020332 A1 | 1/2015 | Jacob et al. |
| 2015/0024080 A1* | 1/2015 | Jacob .................. A46D 1/0253 |
| | | 425/542 |
| 2015/0110540 A1* | 4/2015 | Uresti ................... A46B 9/021 |
| | | 132/218 |
| 2018/0116388 A1 | 5/2018 | De Bardonneche |
| 2021/0169208 A1* | 6/2021 | De Bardonneche ... A46B 9/021 |
| 2022/0047067 A1 | 2/2022 | De Bardonneche |
| 2022/0259415 A1 | 8/2022 | Bonnette et al. |

FOREIGN PATENT DOCUMENTS

| | | |
|---|---|---|
| WO | 2016/166462 | 10/2016 |
| WO | 2020/025862 | 2/2020 |

\* cited by examiner

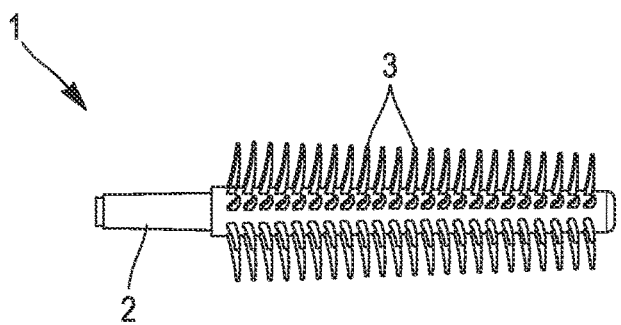
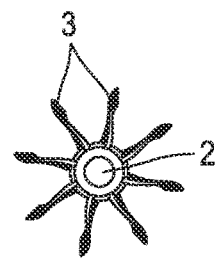
FIG. 1
FIG. 2
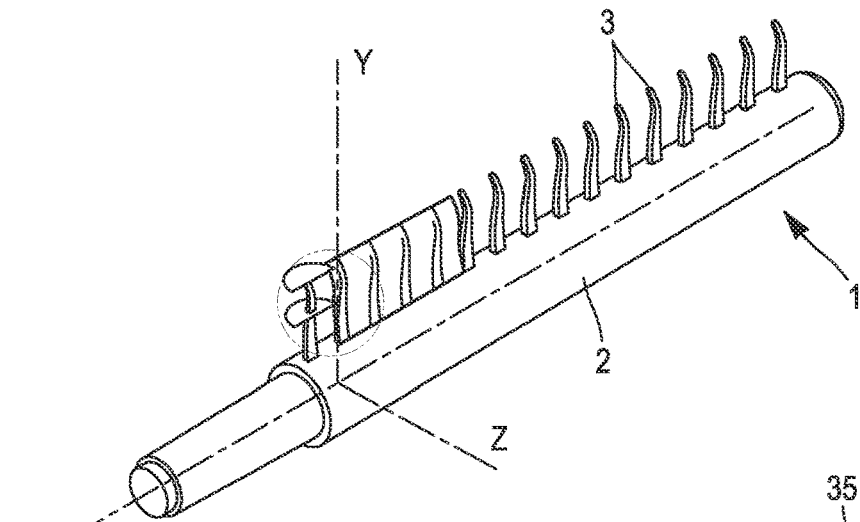
FIG. 3
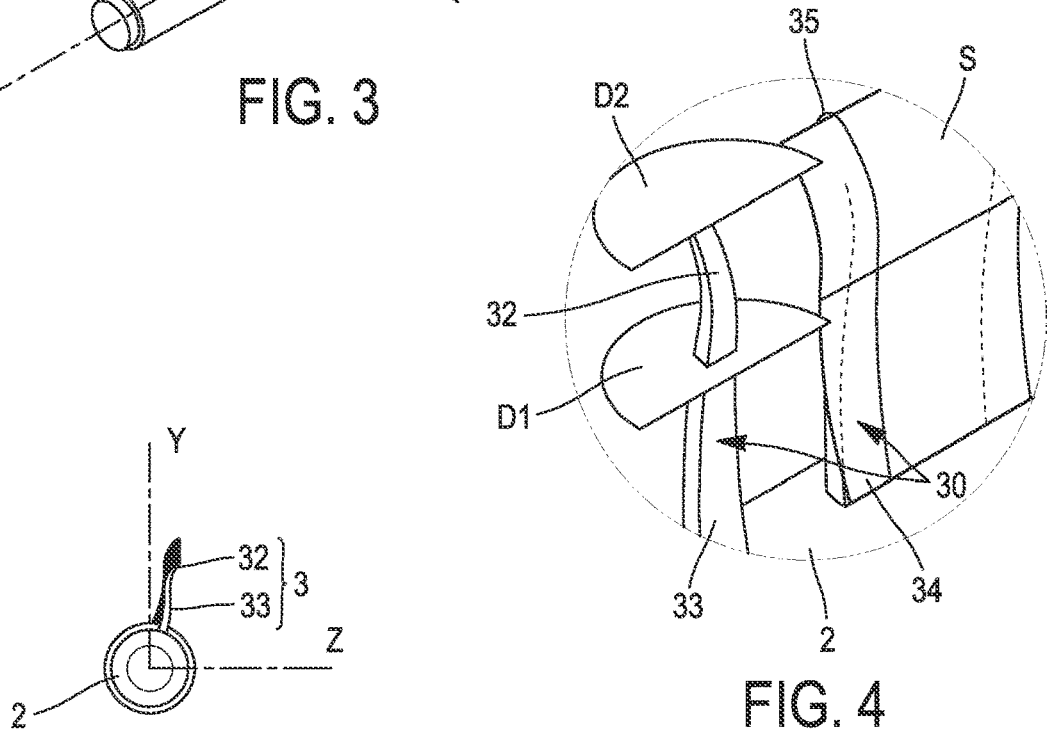
FIG. 4
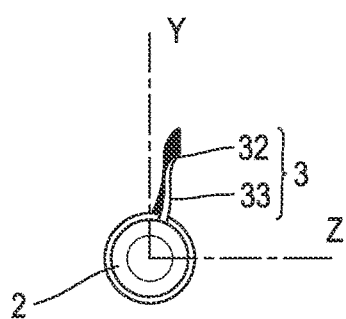
FIG. 5

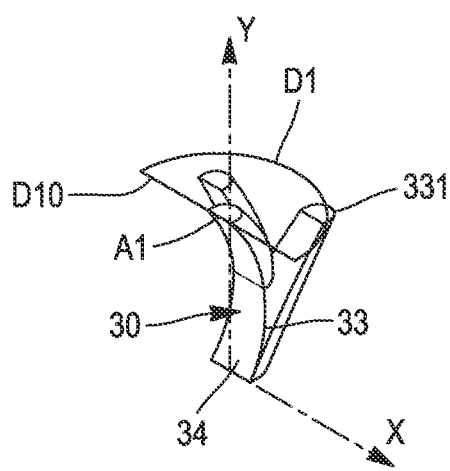
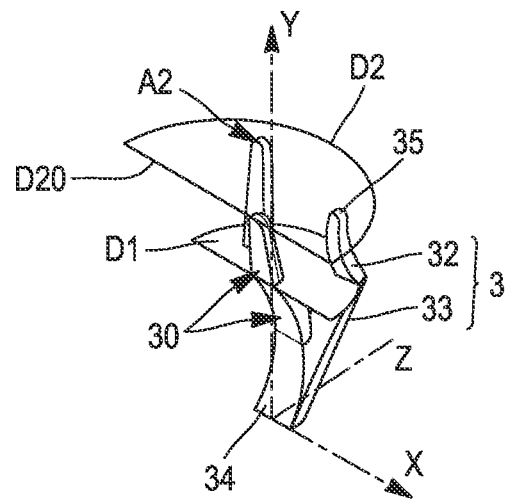
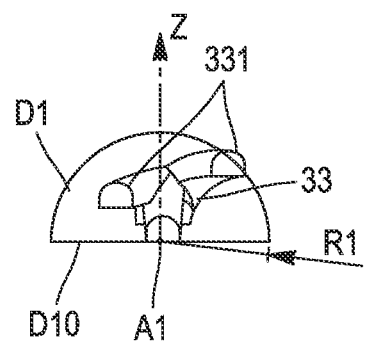
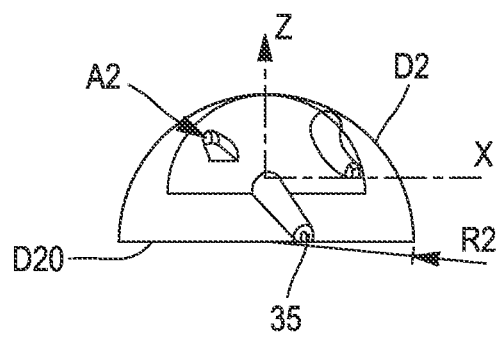
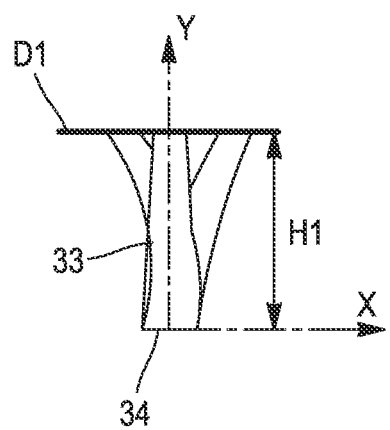
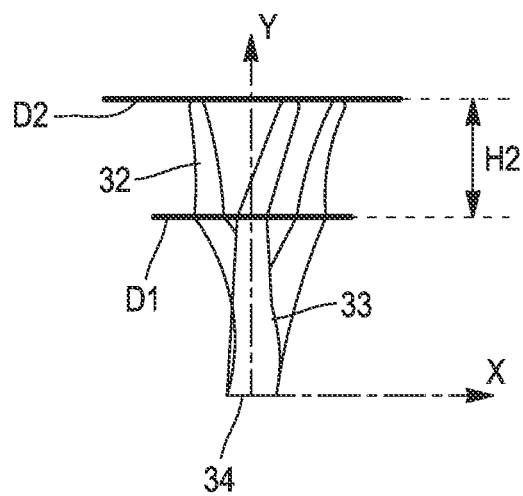
FIG. 6  FIG. 7

APPLICATION DEVICE FOR A FLUID OR PASTY PRODUCT

This application is a U.S. nationalization under 35 U.S.C. § 371 of International Application No. PCT/EP2020/074840, filed Sep. 4, 2020, the entire contents of which are incorporated herein by reference in their entirety.

TECHNICAL FIELD OF THE INVENTION

The invention relates to an applicator device for applying a fluid or pasty product to keratin fibers or to a skin or a portion thereof. In particular, the invention relates to an applicator device for applying a cosmetic, makeup or care, product to hair, eyelashes, eyebrows, skin or lips.

PRIOR ART

Applicator devices for applying a product of a fluid or pasty type to keratin fibers currently exist, such as mascara brushes, for example, comprising a central core of elongate shape extending along a longitudinal axis, at least one row or a plurality of elongate spikes comprising a first end embedded in the core and a second, free end. Usually, the spikes and the core are formed integrally by molding, being in one piece with one another. For example, the document WO2020/025862 describes such applicator devices. The spikes described in that document have a first and a second stage which are superposed one on the other and which develop in one and the same plane of development or elevation of the spike, either a radial plane containing the axis of the core or a plane parallel thereto. As a result, there is uniformity of the elevation of the spikes in one and the same row and/or from one row to another, and regularity of the distribution of the apexes represented by the free end of each of the spikes. Such an arrangement makes it possible to carry out fairly effective application of the cosmetic or makeup product, but this application is not best optimized on account of the abovementioned distribution of the spikes.

SUMMARY OF THE INVENTION

An aim of the invention is to provide an applicator device for applying a fluid or pasty product allowing improved optimized application of the product while maintaining the qualities of comfort for its user.

To this end, the invention provides an applicator device for applying a fluid or pasty product to keratin fibers or to an area of skin, comprising an elongate core extending along a longitudinal axis and having a longitudinal cylindrical shape, a plurality of spikes distributed over said core, each spike extending from an anchoring end in the core to a free end and being formed in one piece with said core, each spike having a first stage extending from the anchoring end to an intermediate section and a second stage extending from the intermediate section to the free end, each spike also having a joint face parallel to the longitudinal axis X, each spike having an intermediate point, at the middle of an intersection segment between the joint face and the intermediate section, contained in a first half-disk of radius R1, a segment of which forming a diametral edge is parallel to the longitudinal axis X and lies on a plane parallel to a radial plane containing the longitudinal axis X, and an apical point, at the middle of an intersection segment of the joint face and a section of the free end, contained in a second half-disk of radius R2, a segment of which forming a diametral edge is parallel to the longitudinal axis X and lies on a plane parallel to the radial plane containing the longitudinal axis X.

Thus, such a structure of the spike makes it possible to obtain a non-uniform distribution of the apexes and of the arrangement of the spikes, giving the impression of chaos, which makes it possible to significantly optimize the application of the product compared with the prior art. In particular in the context of a mascara brush, this allows optimal disentangling of the fibers and optimal application of the product.

Advantageously but optionally, the applicator device according to the invention has at least one of the following features:
  with the first stage having a height H1, a value of the radius R1 is less than or equal to half a value of the height H1;
  with the second stage having a height H2, a value of the radius R2 is less than or equal to a value of the height H2;
  the joint face lies on a complex surface brought about by a generatrix that moves along the longitudinal axis X;
  the generatrix passes through the longitudinal axis X;
  the generatrix has a swivel point at the intermediate section dividing the generatrix into two half-generatrices;
  at least one of the half-generatrices is a curve with a first radius of curvature or a half-segment;
  the other of the half-generatrices is a curve with a second radius of curvature or a half-segment;
  the swivel point is an inflection point;
  each spike has a third stage or more extending from the free end of the second stage and arranged in a similar manner to the second stage;
  at least two spikes of the plurality of spikes have first and second stages that differ from one spike to the other;
  a section of the first stage is different than a section of the second stage;
  each spike has a flank protruding from the joint face;
  the flank has at least one notch;
  the notch straddles the first and second stages;
  the flank has a second notch, the first notch being in the first stage and the second notch being in the second stage; and
at least two spikes of the plurality of spikes have heights H1 and H2 that differ from one spike to the other.

BRIEF DESCRIPTION OF THE FIGURES

Further features and advantages of the invention will become apparent from reading the following description of an embodiment of the invention and variants. In the appended drawings:

FIG. 1 is a side view of a first embodiment of an applicator device according to the invention;

FIG. 2 is a frontal view of the applicator device in FIG. 1;

FIG. 3 is a three-dimensional view of the applicator device in FIG. 1, in which only one row of spikes is shown;

FIG. 4 is a detail view of FIG. 3;

FIG. 5 is a frontal view of the applicator device in FIG. 3;

FIG. 6 is a three-dimensional top and side view of a first stage of a spike of the applicator device according to the invention;

FIG. 7 shows three-dimensional, top and side views of the second stage of a spike of the applicator device according to the invention;

For greater clarity, identical or similar elements are identified by identical reference signs throughout the appended figures.

DETAILED DESCRIPTION OF AN EMBODIMENT

Figure 10:
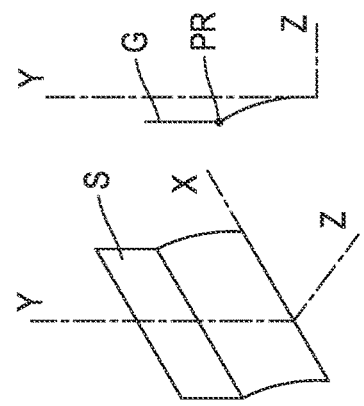
FIGS. 8 to 13 are figures illustrating different ways of generating the complex surface S on which the joint flank-face of the spikes of the applicator device according to the invention lies.
Figure 9:
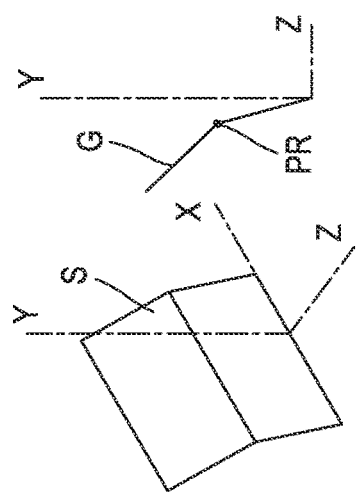

With reference to FIGS. 1 to 5, a first embodiment of an applicator device 1 according to the invention will be described. The applicator device 1 according to the invention is, in this case, a mascara brush. It comprises, in this case, a core 2 that extends longitudinally along a longitudinal axis X. The core 2 may have a cross section that is or is not constant along its length. In the most common embodiments, either the cross section is constant or the cross section decreases from a proximal end engaged with a tube and/or a gripping handle to a distal free end. Generally, the core 2 has a cylindrical overall shape, preferably exhibiting symmetry of revolution about an axis, with a longitudinal axis X. Thus, the cross section of the core 2 may have a circular, polygonal or oval shape or the like. It may be asymmetric. The core 2 may be solid or hollow. A person skilled in the art will choose the most appropriate core 2 depending on the economic and/or technical constraints.

Moreover, the applicator device 1 according to the invention has a plurality of spikes 3 distributed over the core 2. The spikes 3 protrude from an external peripheral surface of the core 2. The spikes 3 are, for example, in one piece with the core 2. In particular, the spikes 3 are obtained by molding with or addition of material to the core 2. In this case, as illustrated, the spikes 3 are distributed two by two in adjacent rows extending longitudinally parallel to the longitudinal axis X. The spikes 3 in one and the same row extend in the same way in one and the same orientation, parallel to one another from the core 2. This subsequently makes it possible to simplify and clarify the explanation and the description of the applicator device 1 according to the invention. In this case, on considering two adjacent rows, the spikes 3 in one of the adjacent rows are oriented differently than the spikes in the adjacent other row.

With reference more specifically to FIGS. 3 to 5, a first embodiment of a spike 3 for the applicator device 1 according to the invention will be described in more detail. The spike 3 has an anchoring end 34 and a free end 35. The anchoring end 34 is connected to the core 2 of the applicator device 1 according to the invention. The spike 3 therefore protrudes from the anchoring end 34 to the free end 35. From the anchoring end 34, the spike 3 has a first stage 33, or proximal stage, followed by a second stage 32, or distal stage, that ends with the free end 35. The junction between the first 33 and second 32 stages of the spike 3 is realized by an intermediate section 331 Illustrated in FIGS. 6 and 7.

The spike 3 also has a joint face 30 substantially parallel to the longitudinal axis X of the core 2 of the application device 1 according to the invention. Note that this joint face 30 is coincident with the joint face of the mold (when injection molding is used to create the applicator device according to the invention): when this joint face of the mold is planar, it is also commonly referred to as parting line.

This joint face 30 extends from the anchoring end 34 to the free end 35. At the first stage, the joint face 30 therefore extends from the anchoring end 34 to the intermediate section 331. The point A1 is defined as being the middle of a segment formed by the intersection of the intermediate section 331 with the joint face 30. With the first stage 33 of the spike 3 extending to a height H1, the point A1 is situated in a virtual half-disk D1 of radius R1, a segment of which forming a diametral edge D10 of the half-disk D1 is parallel to the longitudinal axis X and lies on a plane parallel to a radial plane comprising said longitudinal axis X. Practically, a value of the radius R1 is less than or equal to half a value of the height H1.

From the intermediate section 331 to the free end 35, the second stage 32 has a height H2. It is situated in the continuation of the first stage 33 on which it stands. Again, at a section of the free end 35, a point A2 is defined in the same way as the point A1, meaning that it is situated at the middle of a segment defining the intersection between the section of the free end 35 of the second stage 32 and the joint face 30 of the spike 3. In a manner substantially similar to the first stage 33, the point A2 is situated in a second virtual half-disk D2 of radius R2, a segment of which forming a diametral edge D20 is parallel to the longitudinal axis X and lies on a plane parallel to the radial plane comprising the longitudinal axis X. The virtual half-disk D2 extends parallel to and facing the virtual half-disk D1 at a distance H2. The segment D20 is parallel to the segment D10 and the center of the half-disk D2 is aligned with the center of the half-disk D1 with regard to the axis Z, which is itself perpendicular to the longitudinal axis X, and to the axis Y which is perpendicular to the two others and which defines the direction of development of the spike 3. For example, a value of the radius R2 is less than or equal to a value of the height H2 of the second stage 32 of the spike 3 of the applicator device 1 according to the invention.

With reference to FIGS. 28 to 31, a variant 1' of the first embodiment of an applicator device 1 according to the invention that has just been described will be described. As before, the applicator device 1' according to the invention is, in this case, a mascara brush. It comprises, in this case, a core 2' which extends longitudinally along a longitudinal axis X. The core 2' has, in this case, a frustoconical shape: a cross section decreases from a proximal end engaged with a tube and/or gripping handle to a distal free end. The cross section of the core 2' may have a circular, polygonal or oval shape or the like. It may be asymmetric. The core 2' may be solid or hollow. A person skilled in the art will choose the most appropriate core 2' depending on the economic and/or technical constraints.

Moreover, the applicator device 1' according to the invention has a plurality of spikes 3, 3' distributed over the core 2'. The spikes 3, 3' protrude from an external peripheral surface of the core 2'. The spikes 3, 3' are, for example, in one piece with the core 2'. In particular, the spikes 3, 3' are obtained by molding with or addition of material to the core 2'. In this case, as illustrated, the spikes 3, 3' are distributed in adjacent pairs two by two in two rows extending longitudinally parallel to the longitudinal axis X. The spikes 3' in one and the same row extend in the same way in one and the same orientation, parallel to one another from the core 2'. This subsequently makes it possible to simplify and clarify the explanation and the description of the applicator device 1' according to the invention. In this case, on considering a pair of two adjacent rows, the spikes 3 in one of the facing rows of the pair are oriented differently than the spikes 3' in the other facing row of the pair in question. The spikes 3 and 3' are positioned, in the case, in staggered rows along a line parallel to the longitudinal axis X.

Figure 30:
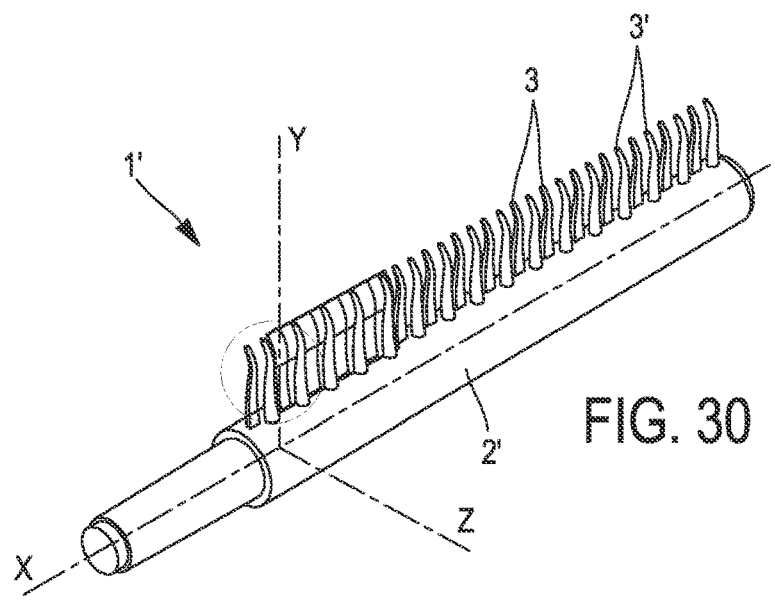
FIG. 30 is a three-dimensional view of the applicator device in FIG. 28, in which two adjacent rows of spikes are shown.
Figure 32:
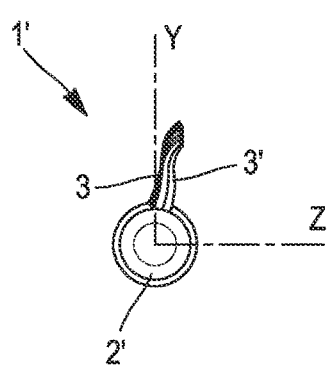
FIG. 32 is a frontal view of the applicator device in FIG. 30.
Figure 31:
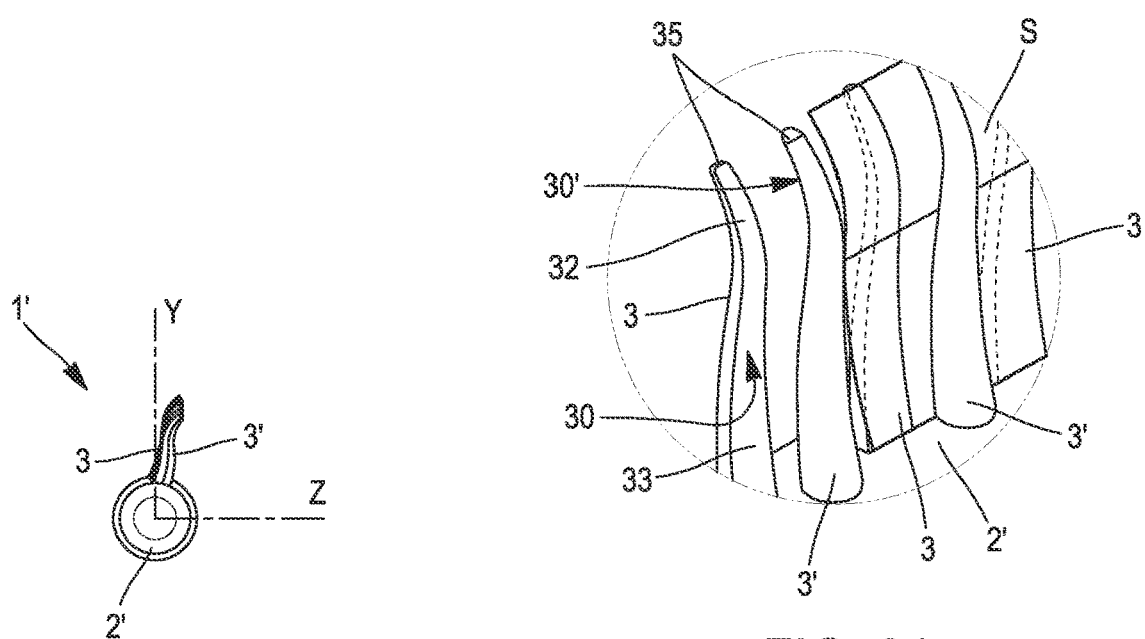
FIG. 31 is a detail view of FIG. 30.

With reference more specifically to FIGS. 30 to 32, the arrangement of the spikes 3 and 3' for the applicator device 1' according to the invention will be described in more detail. The spike 3, 3' has an anchoring end 34 and a free end 35. The anchoring end 34 is connected to the core 2' of the applicator device 1' according to the invention. The spike 3, 3' therefore protrudes from the anchoring end 34 to the free end 35. From the anchoring end 34, the spike 3, 3' has a first stage 33, or proximal stage, followed by a second stage 32, or distal stage, that ends with the free end 35. The junction between the first 33 and second 32 stages of the spike 3 is realized by an intermediate section 331 illustrated in FIGS. 6 and 7, as described above.

The spike 3, 3', respectively, also has a joint face 30, 30', respectively, substantially parallel to the longitudinal axis X of the core 2' of the applicator device 1' according to the invention. These joint faces 30, 30' extend from the anchoring end 34 to the free end 35.

The particular feature of the embodiment of the applicator device 1' according to the invention is that the joint face 30 and the joint face 30' lie on either side of the same complex surface S: thus, the joint face 30' is complementary to the joint face 30.

Such a design and such an arrangement of the spike 3, 3' for an applicator device 1, 1' according to the invention make it possible to realize a position and a varied shape for the spike 3, 3' that may be different from one spike to another in the plurality of spikes provided on the core 2, 2' of the applicator device 1, 1' according to the invention.

With reference to FIGS. 8 to 13, the different ways of creating a complex surface S on which the joint face 30, 30' of each of the spikes 3, 3' of the applicator device 1, 1' according to the invention will be described. The rest of the description will be given in relation to the spike 3 and will apply, mutatis mutandis, to the spike 3'.

In each of the embodiments and embodiment variants of this surface S, the latter is made up of a complex first half-surface S1 corresponding to the first stage 33 of the spike 3 and of a second half-surface S2 corresponding to the second stage 32 of the spike 3. The complex surface S is generated by a generatrix G that moves along the longitudinal axis X. As a result, the generatrix G is realized with the aid of two half-generatrices G1 and G2, respectively generating the first S1 and second S2 half-surfaces, and linked together by a swivel point PR. The swivel point PR is contained in the intermediate section 331 of the spike 3.

Figure 8:
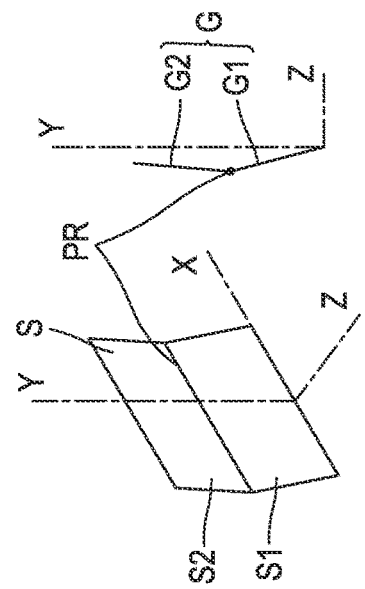

In a first embodiment in FIG. 8, the two half-generatrices G1 and G2 are two half-segments that thus generate planar surfaces S1 and S2. The two half-generatrices G1 and G2 exhibit different directions than one another. It is the same in FIG. 9, except that the orientation of the half-generatrix G2 is reversed compared with what is illustrated in FIG. 8. In FIG. 10, the half-generatrix G1 is a curve, while the half-generatrix G2 remains a half-segment.

Figure 13:
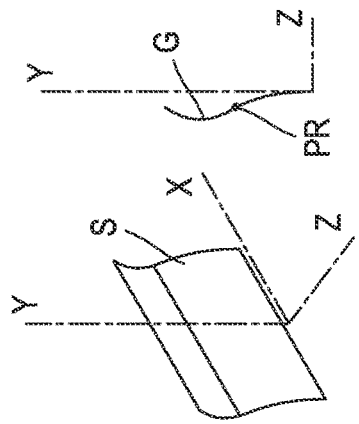
Figure 12:
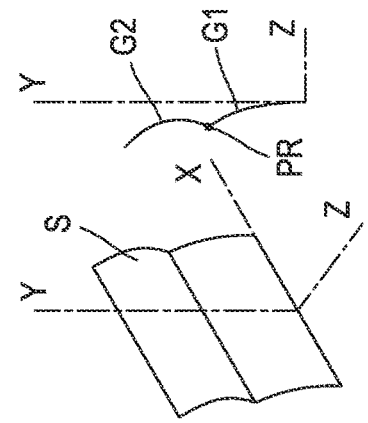
Figure 11:
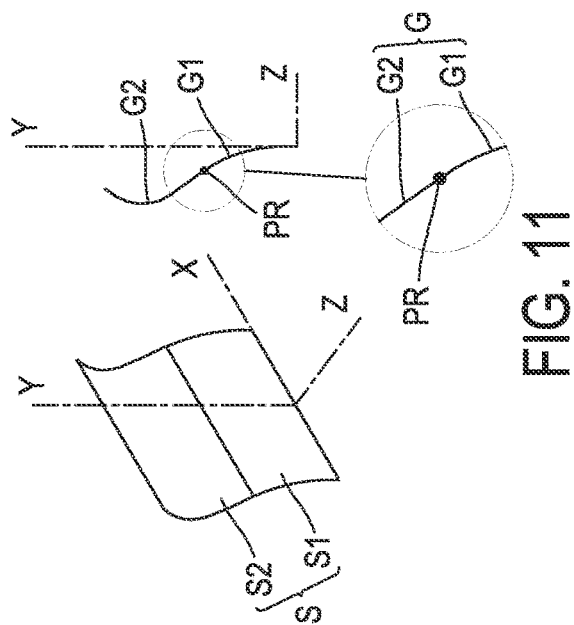

With regard to FIG. 11, the generatrix G is made up of two half-generatrices G1 and G2 formed of curves that respectively have a first and a second radius of curvature. In the case of FIG. 11, the curvatures are opposite and the swivel point PR forms an inflection point of the generatrix G thus formed. The first and second radii of curvature may be identical or different depending on the embodiment chosen. A variant is illustrated in FIG. 13. In FIG. 12, the first and second radii of curvature of the half-generatrices G1 and G2 are in the same direction but the swivel point PR is not an inflection point, unlike FIGS. 11 and 13. Another possible arrangement is that the first half-generatrix G1 is a half-segment and the second generatrix G2 is a curve having a radius of curvature. This would form a complex surface S opposite (the half-surface S1 is planar and the half-surface S2 is curved) to that illustrated in FIG. 10.

Such a realization of the virtual complex surface on which the spike 3 joint face 30 can lie in order to be defined allows the latter to have different and varied surfaces, allowing great freedom of choice as regards the shape of the spike 3 for the applicator device 1 according to the invention.

Figure 14:
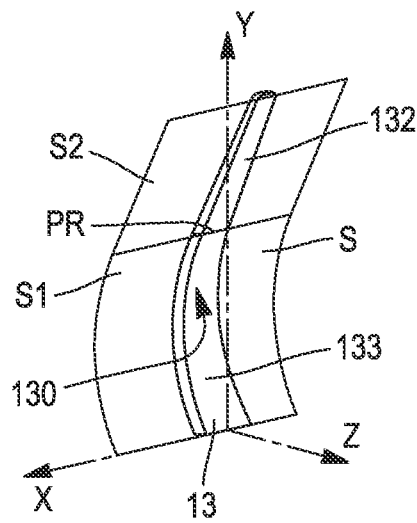
FIG. 14 is a three-dimensional view illustrating an embodiment variant of a spike of the applicator device according to the invention.

Specifically, a second embodiment of a spike 13 for an applicator device 1 according to the invention is illustrated in FIG. 14. This spike 13 has a joint face 130 that lies on a surface S similar to the one illustrated in FIG. 10, except that in this case the swivel point PR forms an inflection point or continuity point (the tangents to the half-surfaces S1 and S2 are identical at the swivel point PR) between the two half-surfaces S1 and S2.

Figure 15:
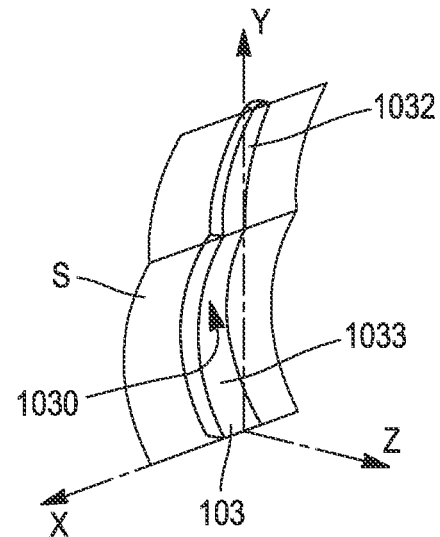
FIG. 15 is a three-dimensional view of a second embodiment of a spike of the applicator device according to the invention.

In FIG. 15, a third embodiment of a spike 103 for an applicator device 1 according to the invention is illustrated. This spike 103, comprising the first 1033 and second 1032 stages, has a joint face 1030 which lies on a complex surface S similar to the one illustrated in FIG. 12 and described above.

Figure 16:
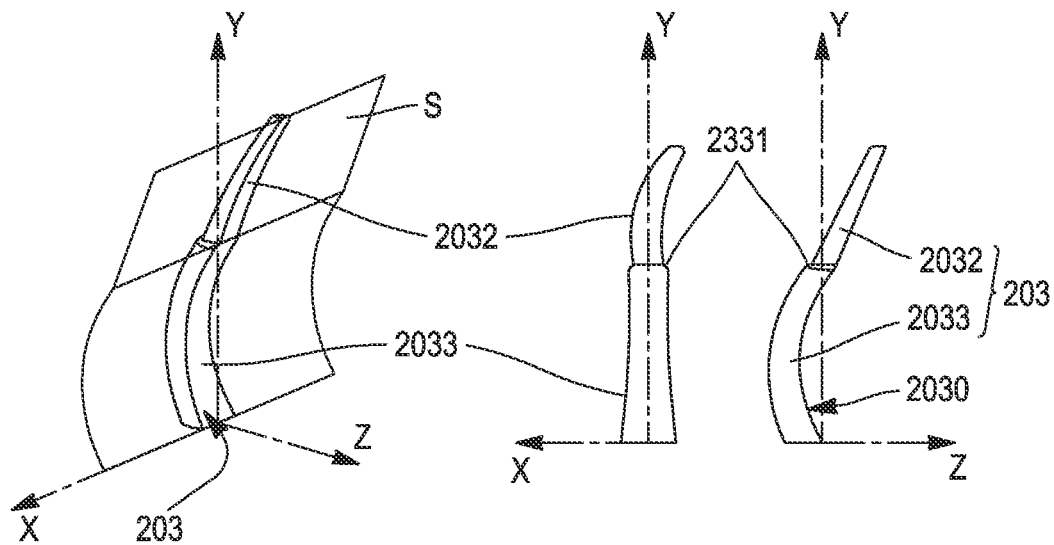
FIG. 16 shows three-dimensional, top and side views of a third embodiment of a spike of the applicator device according to the invention.
Figure 17:
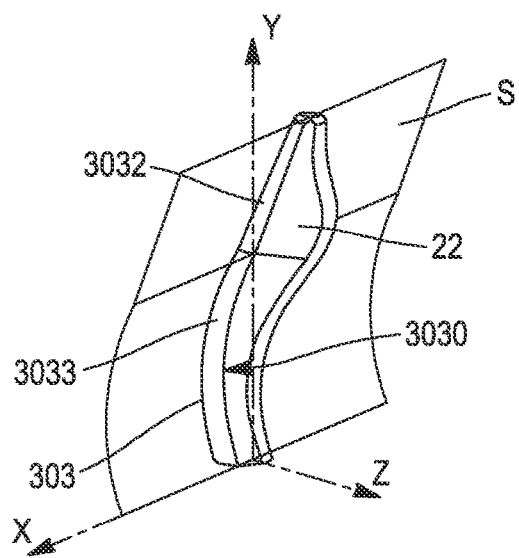
FIG. 17 is a three-dimensional view of a fourth embodiment of a spike for the applicator device according to the invention.

In FIG. 16, a fourth embodiment of a spike 203 for an applicator device 1 according to the invention is Illustrated. This has a joint faces 2030 that lies on a complex surface S similar to the one illustrated in FIG. 10. However, hitherto, in the embodiments of spikes for an applicator device 1 according to the described invention, said spikes had a continuous section in the intermediate section between the first and the second stage forming the spike. In this case, there is a change in section in the intermediate section 2331 between the first 2033 and second 2032 stages.

In FIGS. 17 to 24, different variants or embodiments of a spike for an applicator device 1 according to the invention will be described, which are adaptations of the spike described in the document WO2016/166462, to which reference may be made for more information. In summary, the spike 303 in FIG. 17 has first and second stages 3033 and 3032, the joint face 3030 of which lies on a surface S similar to the one illustrated in FIG. 10. From this joint face 3030, the spike 303 has a flank 22 protruding with a shape exhibiting an edge described in more detail in the above-mentioned prior art document.

Figure 18:
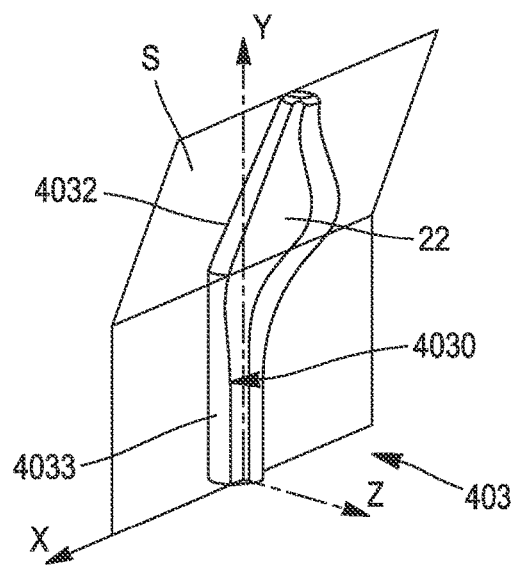
FIG. 18 is a three-dimensional view of a fifth embodiment of a spike for the applicator device according to the invention.

FIG. 18 illustrates a first variant 403 of this spike, made up of two stages 4033 and 4032, except that in this case the joint face 4030 lies on a complex surface S as described above in FIG. 8.

Figure 19:
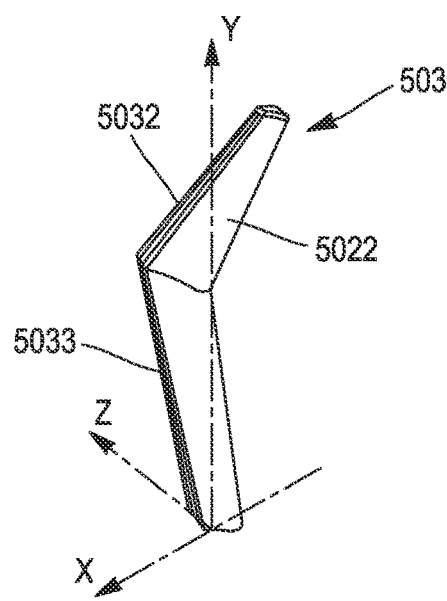
FIGS. 19, 20 and 21 are three-dimensional views of a sixth embodiment and of two variants thereof of a spike for the applicator device according to the invention.
Figure 20:
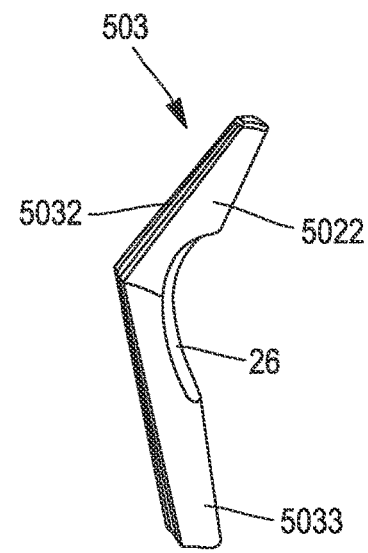
Figure 21:
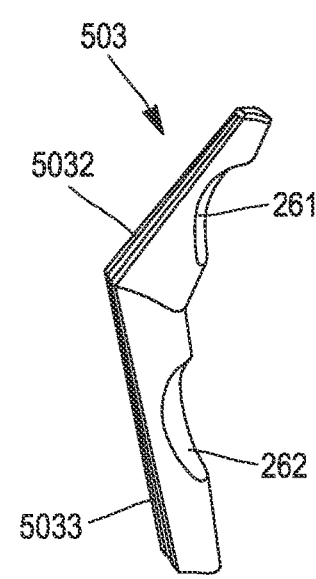

FIG. 19 illustrates a variant 503 of the above-described spike 403. This spike 503 differs from the above-described spike 403 in that the flank 5022 has a rectilinear external edge. In an embodiment variant, the spike 503 illustrated in FIG. 20, for example, has a notch 26 extending over the first 5033 and second 5032 stages. In yet another variant, illustrated in FIG. 21, the spike 503 has a first notch 261 in the second stage 5032 and a second notch 262 in the first stage 5033, the two notches being provided in the flank 5022 of the spike 503.

Figure 22:
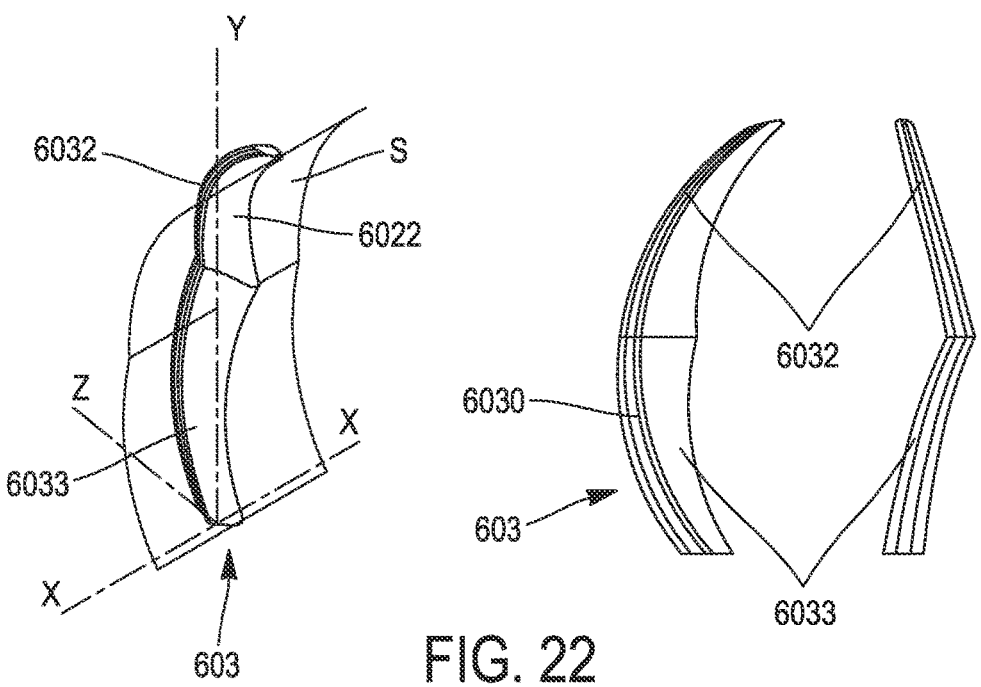
FIG. 22 shows three-dimensional, top and side views of a seventh embodiment of a spike for an applicator device according to the invention.
Figure 23:
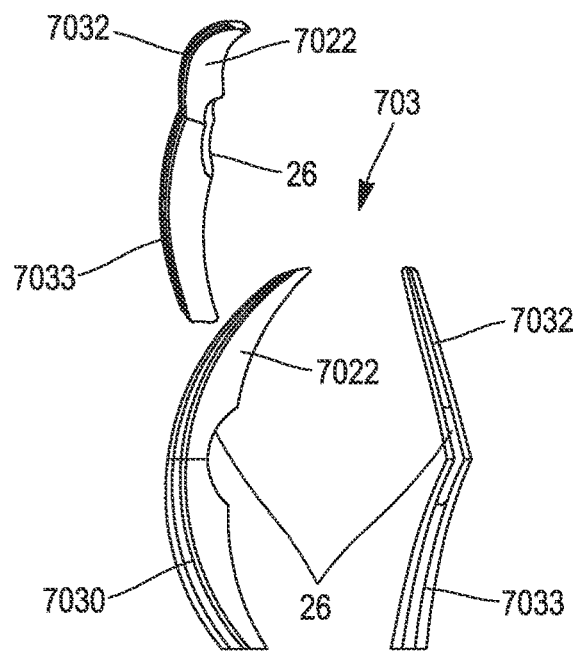
FIGS. 23 and 24 show three-dimensional, side and frontal views of two embodiment variants of the spike in FIG. 22.
Figure 24:
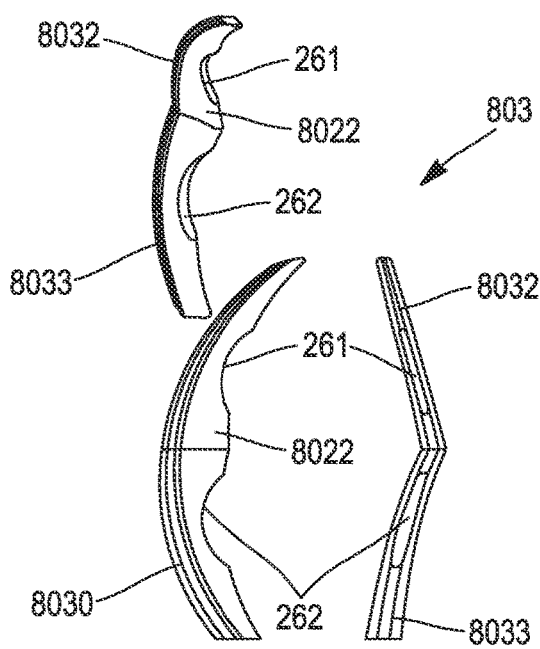

FIGS. 22, 23 and 24 illustrate embodiment variants 603, 703, 803 of the above-described spike 503, except that the joint face 6030, 7030 and 8030 lies on a complex surface S formed of two half-surfaces S1, S2 exhibiting a curve as illustrated for example in FIG. 12. Again, in a spike variant 703, said spike has a notch 26 in the flank 7022 straddling the first 7033 and second 7032 stages. FIG. 24 illustrates the version of the spike 803 with two notches, a first notch 261 provided in the second stage 8032 and a second notch 262 provided in the first stage 8033, the two notches being provided in the flank 8022 of the spike 803 illustrated.

As regards the spikes 603, 703 and 803, the first 6033, 7033, 8033 and second 6032, 7032, 8032 stages exhibit, in side view (perpendicular to the plane XY), different orientations forming an angle in this plane in the intermediate section 331. This configuration described here is transposable to all the other embodiments of the spike that are described.

In the embodiments that have just been described, in particular in FIGS. 20, 21, 23 and 24, the notches 26, 261, 262 make it possible create reservoirs of product which will then be applied to the keratin fibers or the skin depending on the destination of the applicator device 1 according to the invention.

Figure 25:
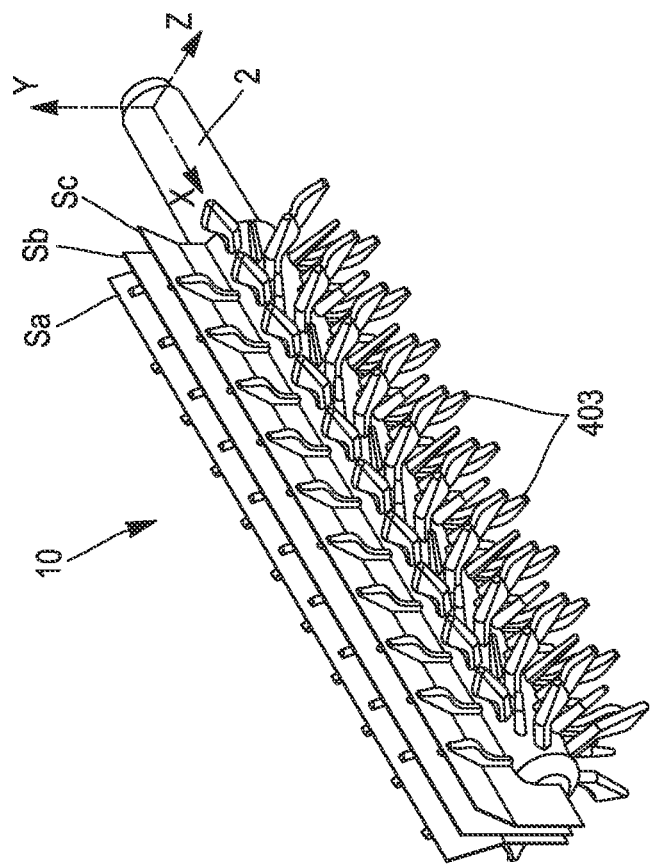
FIG. 25 is a three-dimensional view of a second embodiment of an applicator device according to the invention.
Figure 26:
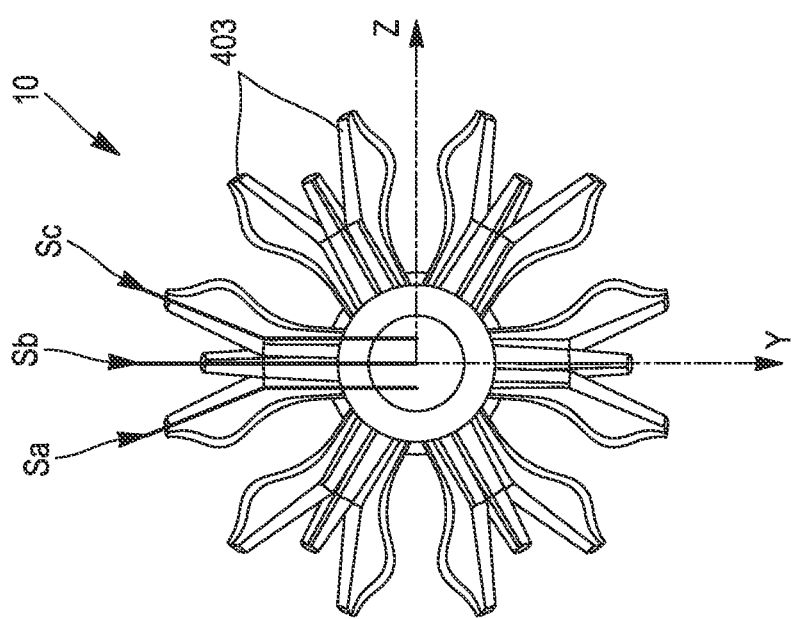
FIG. 26 is a frontal view of the applicator device in FIG. 25.

With reference to FIGS. 25 and 26, a second embodiment of an applicator device 10 according to the invention will now be described. This applicator device 10 according to the invention has a plurality of spikes 403 as described above with reference to FIG. 17 and makes it possible to illustrate some of the possible arrangements of this plurality of spikes 403 on the core 2 of the applicator device 10 according to the invention. In particular in one and the same row of spikes, the spikes have joint faces that lie on three different complex surfaces Sa, Sb, Sc. This makes it possible to have non-uniform positioning and distribution of the free ends of each of the spikes 403, and implantation of the latter in staggered rows on the core 2, giving the impression of a jumble or chaos in this distribution. Of course, it is possible to mix different embodiments of a spike for an applicator device according to the invention as described above on one and the same applicator device 10 according to the invention.

As already illustrated in FIG. 26, the spikes 403 that lie on the complex surface Sb have a total height different than a total height of the spikes 403 that lie on the complex surfaces Sa and Sc.

Figure 27A:
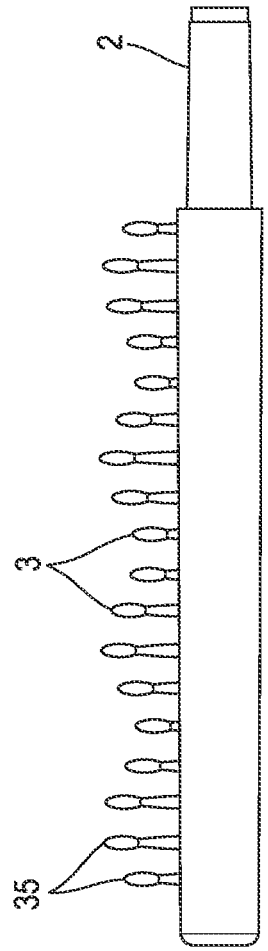
FIGS. 27a and 27b illustrate a third embodiment of an applicator according to the invention, in which only one row of spikes is shown in order to simplify and facilitate the description.
Figure 27B:
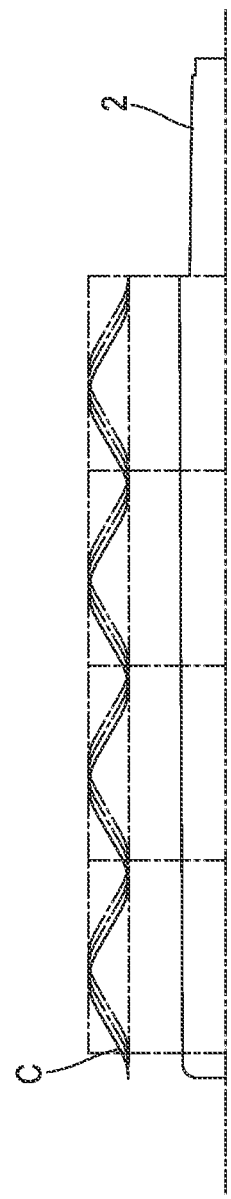
Figure 28:
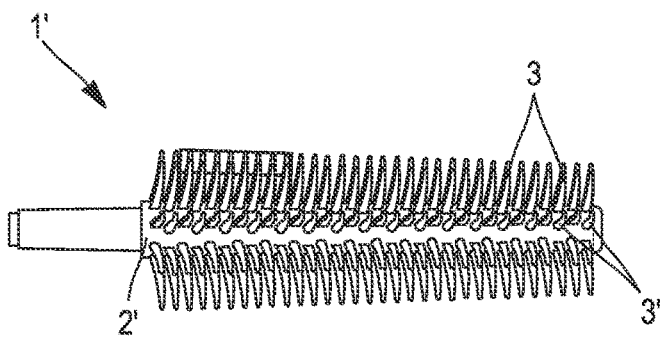
FIG. 28 is a side view of another embodiment of an applicator device according to the invention.
Figure 29:
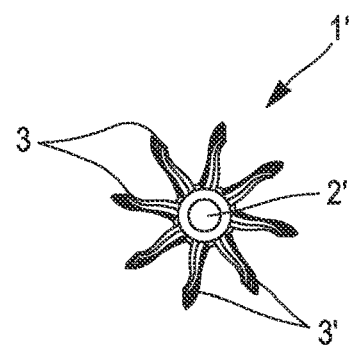
FIG. 29 is a frontal view of the applicator device in FIG. 28.

More generally, as illustrated in FIGS. 27a and 27b, the distribution of the spikes 3 may be such that the different heights make it possible to create a sinusoidal curve C on which the free ends 35 of the spikes 3 lie for one and the same row, in the knowledge that, from one row to another, this sinusoidal C can be offset so as give this impression of chaos or a jumble as described above in FIGS. 25 and 26. In a variant, the curve C may be any curve.

It is therefore clear from the above that such a structure of the spike, as described, for an applicator device according to the invention makes it possible to create a somewhat random distribution of the spikes on the outer surface of the core 2 of the applicator device according to the invention. This makes it possible to improve disentangling of the keratin fibers even further while preserving a quality of application of the fluid or pasty product to said fibers, and the ease of use for a user of the applicator device according to the invention.

Generally, regardless of the embodiment or embodiments of the spike that is chosen to create an applicator device according to the invention, the latter can be produced by injection molding plastics materials (such as thermoplastics, thermoplastic elastomers, thermosetting plastics, etc.) or by addition of material (3D printing) or by any other appropriate manufacturing method for obtaining such structures of an applicator device according to the invention.

Of course, it is possible to make numerous modifications to the invention without departing from the scope thereof.

The invention claimed is:

1. An applicator device for applying a fluid or pasty product to keratin fibers or to an area of skin, comprising:
an elongate core extending along a longitudinal axis X and having a longitudinal cylindrical shape,
a plurality of spikes distributed over said core, each spike extending from an anchoring end in the core to a free end and being formed in one piece with said core,
wherein the each spike has a first stage extending from the anchoring end to an intermediate section and a second stage extending from the intermediate section to the free end,
wherein the each spike also has a joint face parallel to the longitudinal axis X,
wherein the each spike has:
an intermediate point which is at a middle of an intersection segment between the joint face and the intermediate section, the intermediate point being contained in a first half-disk of radius R1, the first half-disk having a first segment forming a diametral edge of the half-disk, the first segment being parallel to the longitudinal axis X and lying on a first plane, the first plane being parallel and distinct to a radial plane containing the longitudinal axis X, the first half-disk extending from the first segment parallel to the longitudinal axis toward of the radial plane and
an apical point which is at a middle of an intersection segment of the joint face and a section of the free end, the apical point being contained in a second half-disk of radius R2, the second half-disk having a second segment forming a diametral edge of the second half-disk, the second segment being parallel to the longitudinal axis X and lying on a second plane, the second plane being parallel and distinct to the radial plane containing the longitudinal axis X, the second half-disk extending from the second segment parallel to the longitudinal axis toward of the radial plane.

2. The applicator device as claimed in claim 1, wherein the first stage having a height H1, a value of the radius R1 is less than or equal to half a value of the height H1.

3. The applicator device as claimed in claim 1, wherein the second stage having a height H21, a value of the radius R2 is less than or equal to a value of the height H2.

4. The applicator device as claimed in one of claim 1, wherein the joint face lies on a surface brought about by a generatrix that moves along the longitudinal axis X.

5. The applicator device as claimed in claim 4, wherein the generatrix passes through the longitudinal axis X.

6. The applicator device as claimed in claim 4, wherein the generatrix has a swivel point at the intermediate section dividing the generatrix into two half-generatrices.

7. The applicator device as claimed in claim 6, wherein at least one of the half-generatrices is a curve with a first radius of curvature or a half-segment.

8. The applicator device as claimed in claim 7, wherein another of the half-generatrices is a curve with a second radius of curvature or a half-segment.

9. The applicator device as claimed in claim 6, wherein the swivel point is an inflection point.

10. The applicator device as claimed in claim 1, wherein the each spike has a third stage or more arranged in a similar manner to the second stage.

11. The applicator device as claimed in claim 1, wherein at least two spikes of the plurality of spikes have first and second stages that differ from one spike to the other.

12. The applicator device as claimed in claim 1, wherein a section of the first stage is different than a section of the second stage.

13. The applicator device as claimed in claim 1, wherein the each spike has a flank protruding from the joint face.

14. The device as claimed in claim 13, wherein the flank has at least one notch.

15. The applicator device as claimed in claim 14, wherein the notch straddles the first and second stages.

16. The applicator device as claimed in claim 14, wherein the flank has a second notch, the first notch being in the first stage and the second notch being in the second stage.

17. The applicator device as claimed in claim 1, wherein at least two spikes of the plurality of spikes have heights H1 and H2 that differ from one spike to the other.

* * * * *